US012495240B2

(12) United States Patent
Knudsen

(10) Patent No.: US 12,495,240 B2
(45) Date of Patent: Dec. 9, 2025

(54) ELEMENT COMPRISING A PHYSICAL FILTER

(71) Applicant: GN HEARING A/S, Ballerup (DK)

(72) Inventor: Emil Holm Knudsen, Copenhagen (DK)

(73) Assignee: GN HEARING A/S, Ballerup (DK)

( * ) Notice: Subject to any disclaimer, the term of this patent is extended or adjusted under 35 U.S.C. 154(b) by 242 days.

(21) Appl. No.: 18/126,235

(22) Filed: Mar. 24, 2023

(65) Prior Publication Data

US 2023/0362531 A1 Nov. 9, 2023

(30) Foreign Application Priority Data

May 6, 2022 (DK) .......................... PA 2022 70241
May 9, 2022 (EP) .................................... 22172216

(51) Int. Cl.
*H04R 25/00* (2006.01)
*H04R 1/10* (2006.01)
*H04R 1/28* (2006.01)

(52) U.S. Cl.
CPC ......... *H04R 1/1058* (2013.01); *H04R 1/1016* (2013.01); *H04R 1/2811* (2013.01); *H04R 25/654* (2013.01); *H04R 2460/11* (2013.01)

(58) Field of Classification Search
CPC ... H04R 1/1058; H04R 1/1016; H04R 1/2811
See application file for complete search history.

(56) References Cited

U.S. PATENT DOCUMENTS 4,987,597 A 1/1991 Haertl
5,327,500 A * 7/1994 Campbell ............ H04R 25/654 381/325
11,095,973 B1 * 8/2021 Zalisk .................. G10K 11/175
2001/0033664 A1 * 10/2001 Poux ...................... H04R 25/70 381/60
2006/0215863 A1 9/2006 Sauer
2011/0096948 A1 4/2011 Rasmussen et al.
2011/0158457 A1 * 6/2011 Ishizaka .................. H04R 1/12 181/135

(Continued)

FOREIGN PATENT DOCUMENTS

EP 1906699 A1 4/2008
EP 2753100 A1 7/2014

(Continued)

OTHER PUBLICATIONS

1st Technical Examination for Danish Patent Appln. No. PA 2022 70241 dated Oct. 27, 2022.

(Continued)

*Primary Examiner* — Simon King
(74) *Attorney, Agent, or Firm* — Vista IP Law Group, LLP

(57) ABSTRACT

Disclosed is a method, a hearing device, and an element configured to be releasably attached to a housing of a hearing device for a user, wherein the element is exchangeable by the user, wherein the element has a dimension which provides that the element is exchangeable by the user's fingers, wherein the element is exchangeable by the user without using a tool, and wherein the element comprises a physical filter configured to be arranged in front of an opening in the housing, when the element is attached to the housing.

19 Claims, 5 Drawing Sheets

(56) References Cited

U.S. PATENT DOCUMENTS

| | | | | |
|---|---|---|---|---|
| 2015/0078601 | A1* | 3/2015 | Petersen | H04R 25/60 381/325 |
| 2017/0006373 | A1* | 1/2017 | Bruss | H04R 1/2849 |
| 2020/0107099 | A1 | 4/2020 | McIntosh et al. | |
| 2020/0304928 | A1 | 9/2020 | Fuglsang-Philip et al. | |
| 2022/0103930 | A1* | 3/2022 | Zhang | H04R 1/023 |
| 2024/0137686 | A1* | 4/2024 | Shen | H04R 1/1041 |

FOREIGN PATENT DOCUMENTS

| | | | |
|---|---|---|---|
| EP | 3761669 | A1 | 1/2021 |
| EP | 3962116 | A1 | 3/2022 |
| WO | WO 2007/005852 | A2 | 1/2007 |
| WO | WO 2007/005852 | A3 | 3/2007 |

OTHER PUBLICATIONS

Extended European Search Report for EP Patent Appln. No. 22172216.8 dated Nov. 3, 2022.

Foreign Examination Report for EP Patent Appln. No. 22172216.8 dated Sep. 22, 2025.

* cited by examiner

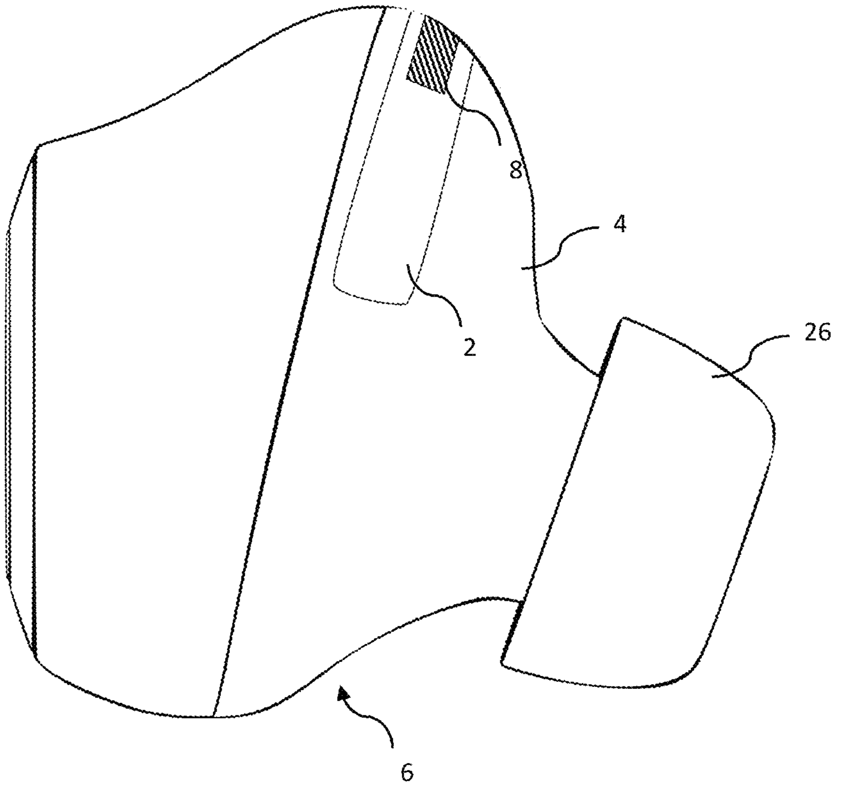
FIG. 1a)
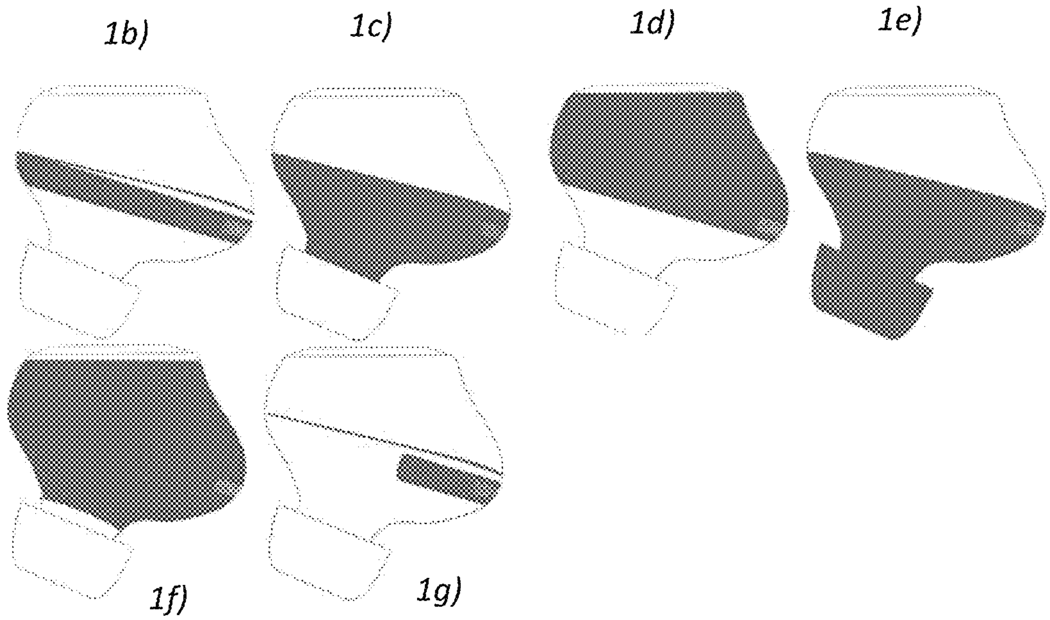

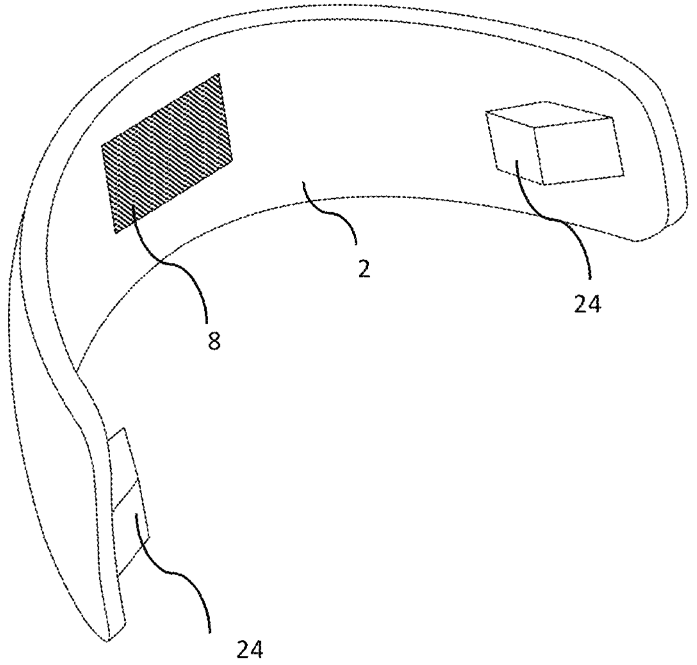
FIG.2a)
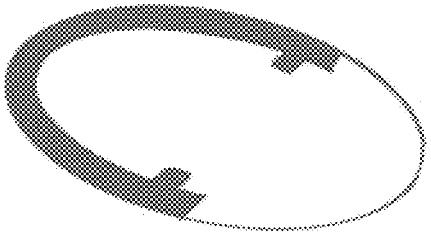
2b)
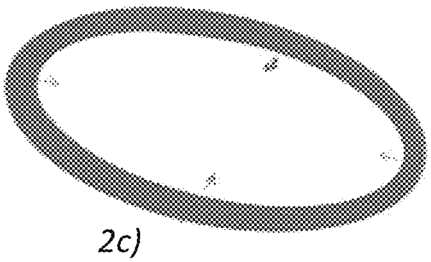
2c)
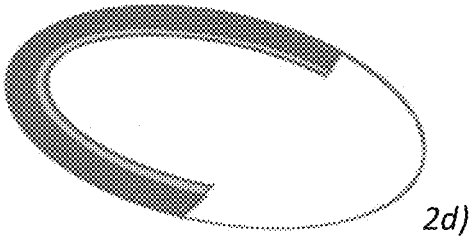
2d)

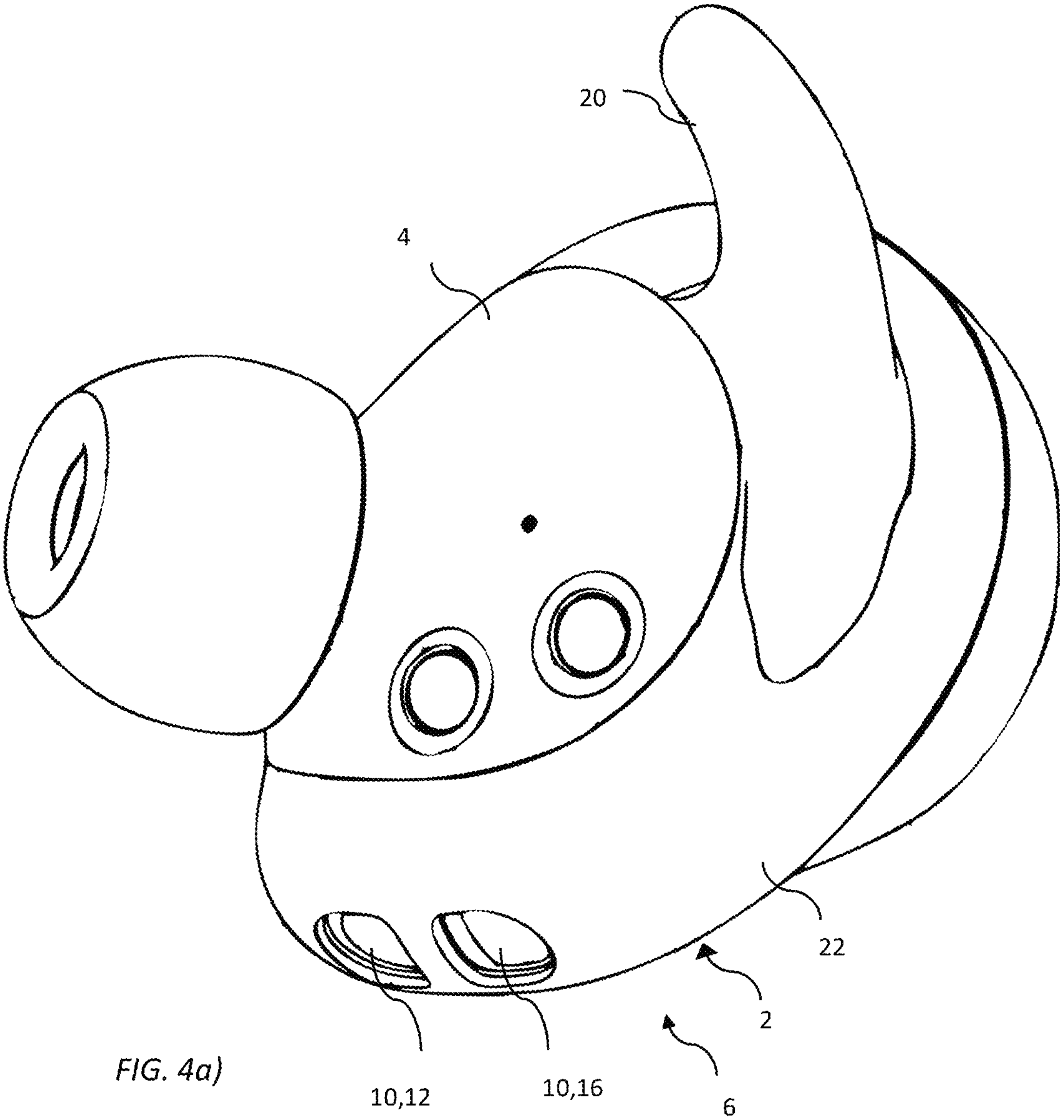
FIG. 4a)
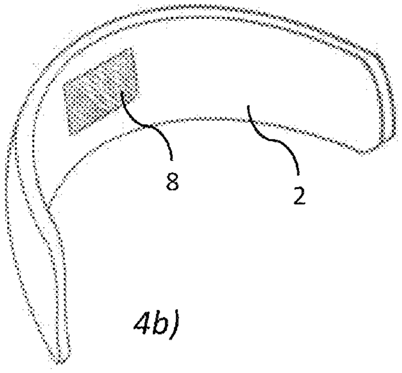
4b)
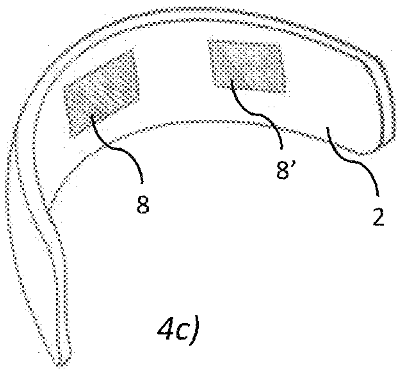
4c)

ELEMENT COMPRISING A PHYSICAL FILTER

RELATED APPLICATION DATA

This application claims priority to, and the benefit of, Danish Patent Application No. PA 2022 70241 filed on May 6, 2022, and European Patent Application No. 22172216.8 filed on May 9, 2022. The entire disclosures of the above applications are expressly incorporated by reference herein.

FIELD

The present application relates to hearing devices. More specifically, the disclosure relates to a physical filter for a hearing device.

BACKGROUND

A physical filter is often arranged in a hearing device for protecting openings of the hearing device against earwax, water and/or dirt.

Prior art filters are small and difficult to exchange, and typically special tools must be used to exchange a filter, e.g. at the audiologists.

Thus, there is a need for an improved physical filter for a hearing device.

SUMMARY

Disclosed is an element configured to be releasably attached to a housing of a hearing device for a user. The element is exchangeable by the user. The element has a dimension which provides that the element is exchangeable by the user's fingers. The element is exchangeable by the user without using a tool. The element comprises a physical filter configured to be arranged in front of an opening in the housing, when the element is attached to the housing.

The element is configured to be releasably attached to a housing of a hearing device for a user. Thus the element may be attached and detached from the housing of the hearing device. The element is exchangeable by the user. The element has a dimension which provides that the element is exchangeable by the user's fingers. The dimension of the element may for example be in a range between about 5 mm and 30 mm, such as in a range between about 5 mm and 25 mm, such as in a range between about 5 mm and 20 mm, such as in a range between about 5 and 15 mm, such as in a range between about 5 mm and 10 mm. A dimension in a range between about 5 mm and 30 mm may be suitable to be gripped by the user's fingers. The element may have an oblong shape, where the length in an longitudinal direction may be about 30 mm, and where a width in a transverse direction is about 5 mm. The element is exchangeable by the user without using a tool. It is an advantage that the user can exchange the element him/herself without using a tool and by only using the fingers. This ensures that the user can exchange the element whenever it is needed, as the user does not have to visit an audiologist or use a special tool.

The element comprises a physical filter. The physical filter may provide protection against earwax, water and/or dirt. The physical filter is configured to be arranged in front of an opening in the housing, when the element is attached to the housing. In a hearing device there may be one or more openings, such as microphone inlet(s) and vent channel opening. These openings are in the hearing device for ensuring that sound and sound pressure can enter or exit the hearing device. However, these openings are likely to be filled with earwax or dirt over time when the user wears the hearing device in the ear.

Thus, it is an advantage that the physical filter is arranged in the element since hereby the physical filter can provide protection for the hearing device against earwax, water and/or dirt.

The physical filter may be filled with earwax and dirt over time when the user wears the hearing device in the ear, and thereby it is an advantage that the physical filter can be exchanged with a new physical filter.

It is an advantage that the element comprises the physical filter because it is easy to replace the element and thereby also easy to replace the filter.

It is an advantage that the user can replace the element him/herself without having to visit the audiologist. Prior art filters are small and difficult to exchange, and typically special tools must be used. Thus, it is an advantage that the whole element is exchangeable and not only the small filter. The physical filter may be made of fabric, plastic texture, woven mesh, grid, polyester etc. The physical filter may e.g. be a so-called HD-15 filter. The physical filter may be a so-called Satifil Acoustex filter. The physical filter may be selected based on the desired function of the filter, for example if the function of the physical filter is to tune the acoustic properties, then the relevant properties may be the sizes of the pores of the filter, and for example if the function of the physical filter is to protect an opening in the housing, then the relevant properties may be a coating of the filter to provide that the physical filter is ingress repellent towards dirt, ear wax etc.

The physical filter may comprise smooth monofilament fibers. The physical filter may have a flat frequency response over the widest possible range. The physical filter may provide efficient protection from dust, metal particles and liquids. The physical filter may provide strict airflow control. The physical filter may be halogen-free. The physical filter may provide low moisture absorption due to polyester polymer.

The physical filter may have a hydrophobic or super-hydrophobic surface which is repellent to water, other liquids, and dirt.

According to an aspect, disclosed is a hearing device to be arranged in an ear of a user. The hearing device comprises a housing. The hearing device comprises an element configured to be releasably attached to the housing. The element is exchangeable by the user. The element has a dimension which provides that the element is exchangeable by the user's fingers. The element is exchangeable by the user without using a tool. The element comprises a physical filter configured to be arranged in front of an opening in the housing, when the element is attached to the housing.

According to an aspect, disclosed is a method for exchanging a physical filter of a hearing device for a user. The physical filter is integrated in an element configured to be releasably attached to a housing of the hearing device. The element is exchangeable by the user. The element has a dimension which provides that the element is exchangeable by the user's fingers. The element is exchangeable by the user without using a tool. The method comprises detaching a present element comprising a physical filter from the housing of the hearing device. The method comprises attaching a new element comprising a physical filter to the housing of the hearing device.

Thus, it is an advantage of the method that for exchanging the physical filter of a hearing device, the releasably attachable element comprising the physical filter is exchanged by detaching the present element with a new element. The new element comprises a new physical filter.

In some embodiments, the opening in the housing is a microphone inlet for a microphone in the hearing device. There may be one or more microphones in the hearing device and thereby also one or more microphone inlets in the housing of the hearing device. The physical filter of the element may be in front of one or more microphone inlets.

In some embodiments, the opening in the housing is a vent opening for a vent channel in the hearing device.

In some embodiments, the element comprises a plurality of physical filters arranged at a plurality of different positions corresponding to different positions on the housing where openings are arranged. For example, the element may comprise two physical filters, where a first filter may be arranged in front of a microphone inlet in the housing, and a second filter may be arranged in front of a vent opening in the housing. The first filter and the second filter may have different properties e.g., a filter for a microphone inlet may differ from a filter for a vent opening.

In some embodiments, the physical filter provides acoustical tuning for the vent channel and/or the microphone. The physical filter may have a flat frequency response over the widest possible range.

In some embodiments, the physical filter provides protection against earwax, water and/or dirt.

In some embodiments, the element comprises a main body and the physical filter. The main body may be shaped to fit the shape of the housing of the hearing device at the place where the main body is attached to the housing. The main body may be formed with a shape complementary to that of the housing of the hearing device. If the housing has a bended shape, then the main body of the element may have a corresponding bended shape. The main body may act as a handle portion allowing for a user to interact with the element to exchange the element. The main body may be provided with one or more handle portions allowing for a user to grip the main body. The main body may be provided with a high friction surface, thus, allowing the user to grip the main body.

In some embodiments, the physical filter is integrated in the main body of the element. It is an advantage that the physical filter is integrated in the main body of the element, thus, facilitating the ease of exchanging the physical filter together with the element.

In some embodiments, the physical filter and the main body are made of the same material. The material may be plastics, silicone etc.

In some embodiments, the physical filter and the main body are made of different materials. The element may be e.g. be manufactured by 2K moulding, since hereby the physical filter and the main body can be manufactured in two different material. The element may be manufactured by overmolding, since hereby the physical filter and the main body can be manufactured in two different material. The main body may e.g. be made of plastic or silicone, and the physical filter may e.g. be made of textile fabric. For example, a physical filter being a fabric may be glued or welded or overmolded to a main body being a plastic or metal part.

In some embodiments, the element is attached to the housing of the hearing device by means of a locking mechanism and/or a connection element. The locking mechanism and/or a connection element may be provided on the element and/or on the housing of the hearing device. The locking mechanism and/or connection element may be a belly-band, a snap-fit, a recess, adhesive, glue, friction fit, snap/hook, press-fit, sticker attachment, protrusion etc. In some embodiments, the element is attached to the housing of the hearing device as a belly band, as a snap-fit, and/or in a recess in the housing. In some embodiments, the element is attached to the housing of the hearing device by means of adhesive, glue and/or friction fit. In some embodiments, the element is attached to the housing of the hearing device by a snap/hook, press fit and/or sticker attachment. The element may be attached to the housing in different ways. The element may partly cover the housing, such as by a cover sock, e.g. the element may cover the entire perimeter, e.g. circumference, of the housing, or the element may cover half of the perimeter, e.g. circumference, of the housing, or the element may cover one third of the perimeter, e.g. circumference, of the housing, or the element may cover one fourth of the perimeter, e.g. circumference, of the housing. In any case, the element should be fixed properly to the housing.

A dome may be attached to the housing, where the dome is configured to be placed at least partly in the ear canal of the user's ear, when the user is wearing the hearing device in its intended position in the ear.

In an example, the element is attached to the housing as a belly band, i.e. the element may extend as a loop around the entire perimeter of the housing, e.g. in the center part of the housing, which may be the thickest part of the housing.

In an example, the element is attached to the housing and extends around the entire perimeter of the housing and covers the housing from about the center part of the housing and down to where the dome is attached the housing.

In an example, the element is attached to the housing and extends around the entire perimeter of the housing and covers the housing from about the center part of the housing and up to the top of the housing.

In an example, the element is attached to the housing and extends around the entire perimeter of the housing and covers the housing from about the center part of the housing and down to also cover the dome. In this example, the dome may be molded together with the element comprising the filter. This may be an advantage as the dome is exchanged together with the element comprising the physical filter, thus, if the dome has built-up dirt or have otherwise deteriorated it may be exchanged when the filter is also exchanged.

In an example, the element is attached to the housing and extends around the entire perimeter of the housing and covers the housing from the top part of the housing and down to where the dome is attached the housing.

In an example, the element is attached to the housing at about or below the center part of the housing, and where the element is a small strip, and where the element does not extend around the entire perimeter of the housing, but only covers a part, such as half, of the perimeter of the housing.

The element may comprise one or more protrusions for attaching the element to the housing of the hearing device, e.g. as a belly band, as a snap-fit, and/or in a recess in the housing. The element may be curved to fit the outer curved shape of the housing of the hearing device. The element may be curved in a shape of a half-circle to fit to the housing. For example, two protrusions may be provided on the element, one protrusion in each end of the element to attach the element to the housing.

The protrusions are preferably formed with complementary shapes to one or more recesses formed in the housing of the hearing device, to thereby provide a mechanical connection between the housing and the element.

The position of the locking mechanism and/or connection element may be e.g. on edges of the housing, such as on the thickest part of the housing. The position of the locking mechanism and/or connection element may be e.g. in the ends of the element.

The locking mechanism and/or connection element may be provided in a 2K moulding process. The main body of the element may be moulded from a stiffer material and a softer lip may be molded on the edge of the main body. The lip may for example act to facilitate a press fit connection between the element and the housing.

In some embodiments, the element comprises a retention member for retention of the hearing device in the user's ear. The element may comprise the main body configured to be attached to the housing of the hearing device, and the retention member may extend from the main body. The retention member may be used e.g. when the user performs sports activities or if the user wants the hearing device to be very fixed in the ear for other reasons. The retention member typically lies against the concha of the ear, when the user wears the hearing device with the element comprising the retention member.

In some embodiments, the retention member is shaped as an open-ended wing, or as a closed-end hoop. The retention member may further act as a handle portion allowing for a user to interact with the element and exchange the element by the user's fingers.

In some embodiments, the element is made in a first material and the retention member is made in a second material, and wherein the first material is harder than the second material. In some embodiments, the main body of the element is made in a first material and the retention member is made in a second material, and wherein the first material is harder than the second material. The first material of the element may typically be hard plastic as this may provide the best attachment and fixture on the housing so that the element stays in place in front of the opening in the housing. The second material of the retention member may be a soft material, e.g. silicone, as this is comfortable when pressing on the concha of the user's ear.

In an embodiment, a hearing device is configured to be worn by a user. The hearing device may be arranged at the user's ear, on the user's ear, over the user's ear, in the user's ear, in the user's ear canal, behind the user's ear and/or in the user's concha, i.e., the hearing device is configured to be worn in, on, over and/or at the user's ear. The user may wear two hearing devices, one hearing device at each ear. The two hearing devices may be connected, such as wirelessly connected and/or connected by wires, such as a binaural hearing aid system.

The hearing device may be a hearable such as a headset, headphone, earphone, earbud, hearing aid, a personal sound amplification product (PSAP), an over-the-counter (OTC) hearing device, a hearing protection device, a one-size-fits-all hearing device, a custom hearing device or another head-wearable hearing device. Hearing devices can include both prescription devices and non-prescription devices.

The hearing device may be embodied in various housing styles or form factors. Some of these form factors are Behind-the-Ear (BTE) hearing device, Receiver-in-Canal (RIC) hearing device, Receiver-in-Ear (RIE) hearing device or Microphone-and-Receiver-in-Ear (MaRIE) hearing device. These devices may comprise a BTE unit configured to be worn behind the ear of the user and an in the ear (ITE) unit configured to be inserted partly or fully into the user's ear canal. Generally, the BTE unit may comprise at least one input transducer, a power source and a processing unit. The term BTE hearing device refers to a hearing device where the receiver, i.e. the output transducer, is comprised in the BTE unit and sound is guided to the ITE unit via a sound tube connecting the BTE and ITE units, whereas the terms RIE, RIC and MaRIE hearing devices refer to hearing devices where the receiver may be comprise in the ITE unit, which is coupled to the BTE unit via a connector cable or wire configured for transferring electric signals between the BTE and ITE units.

Some of these form factors are In-the-Ear (ITE) hearing device, Completely-in-Canal (CIC) hearing device or Invisible-in-Canal (IIC) hearing device. These hearing devices may comprise an ITE unit, wherein the ITE unit may comprise at least one input transducer, a power source, a processing unit and an output transducer. These form factors may be custom devices, meaning that the ITE unit may comprise a housing having a shell made from a hard material, such as a hard polymer or metal, or a soft material such as a rubber-like polymer, molded to have an outer shape conforming to the shape of the specific user's ear canal.

Some of these form factors are earbuds, on the ear headphones or over the ear headphones. The person skilled in the art is well aware of different kinds of hearing devices and of different options for arranging the hearing device in, on, over and/or at the ear of the hearing device wearer. The hearing device (or pair of hearing devices) may be custom fitted, standard fitted, open fitted and/or occlusive fitted.

In an embodiment, the hearing device may comprise one or more input transducers. The one or more input transducers may comprise one or more microphones. The one or more input transducers may comprise one or more vibration sensors configured for detecting bone vibration. The one or more input transducer(s) may be configured for converting an acoustic signal into a first electric input signal. The first electric input signal may be an analogue signal. The first electric input signal may be a digital signal. The one or more input transducer(s) may be coupled to one or more analogue-to-digital converter(s) configured for converting the analogue first input signal into a digital first input signal.

In an embodiment, the hearing device may comprise one or more antenna(s) configured for wireless communication. The one or more antenna(s) may comprise an electric antenna. The electric antenna may be configured for wireless communication at a first frequency. The first frequency may be above 800 MHz, preferably a wavelength between 900 MHz and 6 GHz. The first frequency may be 902 MHz to 928 MHz. The first frequency may be 2.4 to 2.5 GHz. The first frequency may be 5.725 GHz to 5.875 GHz. The one or more antenna(s) may comprise a magnetic antenna. The magnetic antenna may comprise a magnetic core. The magnetic antenna may comprise a coil. The coil may be coiled around the magnetic core. The magnetic antenna may be configured for wireless communication at a second frequency. The second frequency may be below 100 MHz. The second frequency may be between 9 MHz and 15 MHz.

In an embodiment, the hearing device may comprise one or more wireless communication unit(s). The one or more wireless communication unit(s) may comprise one or more wireless receiver(s), one or more wireless transmitter(s), one or more transmitter-receiver pair(s) and/or one or more transceiver(s). At least one of the one or more wireless communication unit(s) may be coupled to the one or more antenna(s). The wireless communication unit may be configured for converting a wireless signal received by at least one of the one or more antenna(s) into a second electric input signal. The hearing device may be configured for wired/ wireless audio communication, e.g. enabling the user to listen to media, such as music or radio and/or enabling the user to perform phone calls.

In an embodiment, the wireless signal may originate from one or more external source(s) and/or external devices, such as spouse microphone device(s), wireless audio transmitter(s), smart computer(s) and/or distributed microphone array(s) associated with a wireless transmitter. The wireless input signal(s) may origin from another hearing device, e.g., as part of a binaural hearing system and/or from one or more accessory device(s), such as a smartphone and/or a smart watch.

In an embodiment, the hearing device may include a processing unit. The processing unit may be configured for processing the first and/or second electric input signal(s). The processing may comprise compensating fora hearing loss of the user, i.e., apply frequency dependent gain to input signals in accordance with the user's frequency dependent hearing impairment. The processing may comprise performing feedback cancelation, beamforming, tinnitus reduction/masking, noise reduction, noise cancellation, speech recognition, bass adjustment, treble adjustment and/or processing of user input. The processing unit may be a processor, an integrated circuit, an application, functional module, etc. The processing unit may be implemented in a signal-processing chip or a printed circuit board (PCB). The processing unit may be configured to provide a first electric output signal based on the processing of the first and/or second electric input signal(s). The processing unit may be configured to provide a second electric output signal. The second electric output signal may be based on the processing of the first and/or second electric input signal(s).

In an embodiment, the hearing device may comprise an output transducer. The output transducer may be coupled to the processing unit. The output transducer may be a receiver. It is noted that in this context, a receiver may be a loudspeaker, whereas a wireless receiver may be a device configured for processing a wireless signal. The receiver may be configured for converting the first electric output signal into an acoustic output signal. The output transducer may be coupled to the processing unit via the magnetic antenna. The output transducer may be comprised in an ITE unit or in an earpiece, e.g. Receiver-in-Ear (RIE) unit or Microphone-and-Receiver-in-Ear (MaRIE) unit, of the hearing device. One or more of the input transducer(s) may be comprised in an ITE unit or in an earpiece.

In an embodiment, the wireless communication unit may be configured for converting the second electric output signal into a wireless output signal. The wireless output signal may comprise synchronization data. The wireless communication unit may be configured for transmitting the wireless output signal via at least one of the one or more antennas.

In an embodiment, the hearing device may comprise a digital-to-analogue converter configured to convert the first electric output signal, the second electric output signal and/or the wireless output signal into an analogue signal.

In an embodiment, the hearing device may comprise a vent. A vent is a physical passageway such as a canal or tube primarily placed to offer pressure equalization across a housing placed in the ear such as an ITE hearing device, an ITE unit of a BTE hearing device, a CIC hearing device, a RIE hearing device, a RIC hearing device, a MaRIE hearing device or a dome tip/earmold. The vent may be a pressure vent with a small cross section area, which is preferably acoustically sealed. The vent may be an acoustic vent configured for occlusion cancellation. The vent may be an active vent enabling opening or closing of the vent during use of the hearing device. The active vent may comprise a valve.

In an embodiment, the hearing device may comprise a power source. The power source may comprise a battery providing a first voltage. The battery may be a rechargeable battery. The battery may be a replaceable battery. The power source may comprise a power management unit. The power management unit may be configured to convert the first voltage into a second voltage. The power source may comprise a charging coil. The charging coil may be provided by the magnetic antenna.

In an embodiment, the hearing device may comprise a memory, including volatile and non-volatile forms of memory.

The hearing device may be a headset, a hearing aid, a hearable etc. The hearing device may be an in-the-ear (ITE) hearing device, a receiver-in-ear (RIE) hearing device, a receiver-in-canal (RIC) hearing device, a microphone-and-receiver-in-ear (MaRIE) hearing device, a behind-the-ear (BTE) hearing device comprising an ITE unit, or a one-size-fits-all hearing device etc.

The hearing device is configured to be worn by a user. The hearing device may be arranged at the user's ear, on the user's ear, in the user's ear, in the user's ear canal, behind the user's ear etc. The user may wear two hearing devices, one hearing device at each ear. The two hearing devices may be connected, such as wirelessly connected.

The hearing device may be configured for audio communication, e.g. enabling the user to listen to media, such as music or radio, and/or enabling the user to perform phone calls. The hearing device may be configured for performing hearing compensation for the user. The hearing device may be configured for performing noise cancellation etc.

The hearing device may comprise a RIE unit. The RIE unit typically comprises the earpiece such as a housing, a plug connector, and an electrical wire/tube connecting the plug connector and earpiece. The earpiece may comprise an in-the-ear housing, a receiver, such as a receiver configured for being provided in an ear of a user, and an open or closed dome. The dome may support correct placement of the earpiece in the ear of the user. The RIE unit may comprise an input transducer e.g. a microphone or a receiver, an output transducer e.g. an speaker, one or more sensors, and/or other electronics. Some electronic components may be placed in the earpiece, while other electronic components may be placed in the plug connector. The receiver may be with a different strength, i.e. low power, medium power, or high power. The electrical wire/tube provides an electrical connection between electronic components provided in the earpiece of the RIE unit and electronic components provided in the BTE unit. The electrical wire/tube as well as the RIE unit itself may have different lengths.

The hearing device may comprise an output transducer e.g. a speaker or receiver. The output transducer may be a part of a printed circuit board (PCB) of the hearing device. The output transducer may be arranged on a printed circuit board (PCB) of the hearing device. The output transducer may not be a part of the PCB of the hearing device. The output transducer may be configured to be arranged on the PCB of the hearing device. For instance, the output transducer may be configured to be arranged on an allocated position/area on the PCB of the hearing device. The output transducer may be arranged through a hole in the PCB.

The hearing device may comprise a first input transducer, e.g. a microphone, to generate one or more microphone output signals based on a received audio signal. The audio signal may be an analogue signal. The microphone output signal may be a digital signal. Thus, the first input transducer, e.g. microphone, or an analogue-to-digital converter, may convert the analogue audio signal into a digital microphone output signal. All the signals may be sound signals or signals comprising information about sound.

The hearing device may comprise a signal processor. The one or more microphone output signals may be provided to the signal processor for processing the one or more microphone output signals. The signals may be processed such as to compensate for a user's hearing loss or hearing impairment. The signal processor may provide a modified signal. All these components may be comprised in a housing of an ITE unit or a BTE unit. The hearing device may comprise a receiver or output transducer or speaker or loudspeaker. The receiver may be connected to an output of the signal processor. The receiver may output the modified signal into the user's ear. The receiver, or a digital-to-analogue converter, may convert the modified signal, which is a digital signal, from the processor to an analogue signal. The receiver may be comprised in an ITE unit or in an earpiece, e.g. RIE unit or MaRIE unit. The hearing device may comprise more than one microphone, and the ITE unit or BTE unit may comprise at least one microphone and the RIE unit may also comprise at least one microphone.

The hearing device signal processor may comprise elements such as an amplifier, a compressor and/or a noise reduction system etc. The signal processor may be implemented in a signal-processing chip or on the PCB of the hearing device. The hearing device may further have a filter function, such as compensation filter for optimizing the output signal.

The hearing device may comprise one or more antennas for radio frequency communication. The one or more antenna may be configured for operation in ISM frequency band. One of the one or more antennas may be an electric antenna. One or the one or more antennas may be a magnetic induction coil antenna. Magnetic induction, or near-field magnetic induction (NFMI), typically provides communication, including transmission of voice, audio and data, in a range of frequencies between 2 MHz and 15 MHz. At these frequencies the electromagnetic radiation propagates through and around the human head and body without significant losses in the tissue.

The magnetic induction coil may be configured to operate at a frequency below 100 MHz, such as at below 30 MHz, such as below 15 MHz, during use. The magnetic induction coil may be configured to operate at a frequency range between 1 MHz and 100 MHz, such as between 1 MHz and 15 MHz, such as between 1 MHz and 30 MHz, such as between 5 MHz and 30 MHz, such as between 5 MHz and 15 MHz, such as between 10 MHz and 11 MHz, such as between 10.2 MHz and 11 MHz. The frequency may further include a range from 2 MHz to 30 MHz, such as from 2 MHz to 10 MHz, such as from 2 MHz to 10 MHz, such as from 5 MHz to 10 MHz, such as from 5 MHz to 7 MHz.

The electric antenna may be configured for operation at a frequency of at least 400 MHz, such as of at least 800 MHz, such as of at least 1 GHz, such as at a frequency between 1.5 GHz and 6 GHz, such as at a frequency between 1.5 GHz and 3 GHz such as at a frequency of 2.4 GHz. The antenna may be optimized for operation at a frequency of between 400 MHz and 6 GHz, such as between 400 MHz and 1 GHz, between 800 MHz and 1 GHz, between 800 MHz and 6 GHz, between 800 MHz and 3 GHz, etc. Thus, the electric antenna may be configured for operation in ISM frequency band. The electric antenna may be any antenna capable of operating at these frequencies, and the electric antenna may be a resonant antenna, such as monopole antenna, such as a dipole antenna, etc. The resonant antenna may have a length of $\lambda/4\pm10\%$ or any multiple thereof, A being the wavelength corresponding to the emitted electromagnetic field.

The hearing device may comprise one or more wireless communications unit(s) or radios. The one or more wireless communications unit(s) are configured for wireless data communication, and in this respect interconnected with the one or more antennas for emission and reception of an electromagnetic field. Each of the one or more wireless communication unit may comprise a transmitter, a receiver, a transmitter-receiver pair, such as a transceiver, and/or a radio unit. The one or more wireless communication units may be configured for communication using any protocol as known for a person skilled in the art, including Bluetooth, WLAN standards, manufacture specific protocols, such as tailored proximity antenna protocols, such as proprietary protocols, such as low-power wireless communication protocols, RF communication protocols, magnetic induction protocols, etc. The one or more wireless communication units may be configured for communication using same communication protocols, or same type of communication protocols, or the one or more wireless communication units may be configured for communication using different communication protocols.

The wireless communication unit may connect to the hearing device signal processor and the antenna, for communicating with one or more external devices, such as one or more external electronic devices, including at least one smart phone, at least one tablet, at least one hearing accessory device, including at least one spouse microphone, remote control, audio testing device, etc., or, in some embodiments, with another hearing device, such as another hearing device located at another ear, typically in a binaural hearing device system.

The hearing device may be a binaural hearing device. The hearing device may be a first hearing device and/or a second hearing device of a binaural hearing device.

The hearing device may be a device configured for communication with one or more other device, such as configured for communication with another hearing device or with an accessory device or with a peripheral device.

The present disclosure relates to different aspects including the element, the hearing device, and the method described above and in the following, and corresponding element, hearing devices, methods and device parts, each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE DRAWINGS

The above and other features and advantages will become readily apparent to those skilled in the art by the following detailed description of exemplary embodiments thereof with reference to the attached drawings, in which:

FIG. 1*a*) schematically illustrate an exemplary hearing device 6 for a user, where an element 2 is releasably attached to a housing 4 of the hearing device.

FIGS. 1*b*), 1*c*), 1*d*), 1*e*), 1*f*) and 1*g*) also schematically illustrate exemplary hearing devices for a user, as FIG. 1*a*), where an element is releasably attached to a housing of the hearing device, and where the element comprises a physical filter configured to be attached in front of an opening in the housing. FIG. 1*b*)-1*g*) illustrates different examples of the element.

FIG. 2*a*) schematically illustrates an exemplary element 2 configured to be releasably attached to a housing of a hearing device for a user.

FIGS. 2*b*), 2*c*) and 2*d*) schematically illustrate exemplary elements, locking mechanisms and/or connection elements for the housing of the hearing device.

FIG. 4*a*) schematically illustrates an exemplary hearing device 6 to be arranged in an ear of a user, where the hearing device 6 comprises a housing 4, and where the housing comprises one or more openings 10.

FIGS. 4*b*) and 4*c*) schematically illustrate exemplary elements comprising one or more physical filters arranged at one or more different positions corresponding to different positions on the housing where openings are arranged.

DETAILED DESCRIPTION

Figure 3:
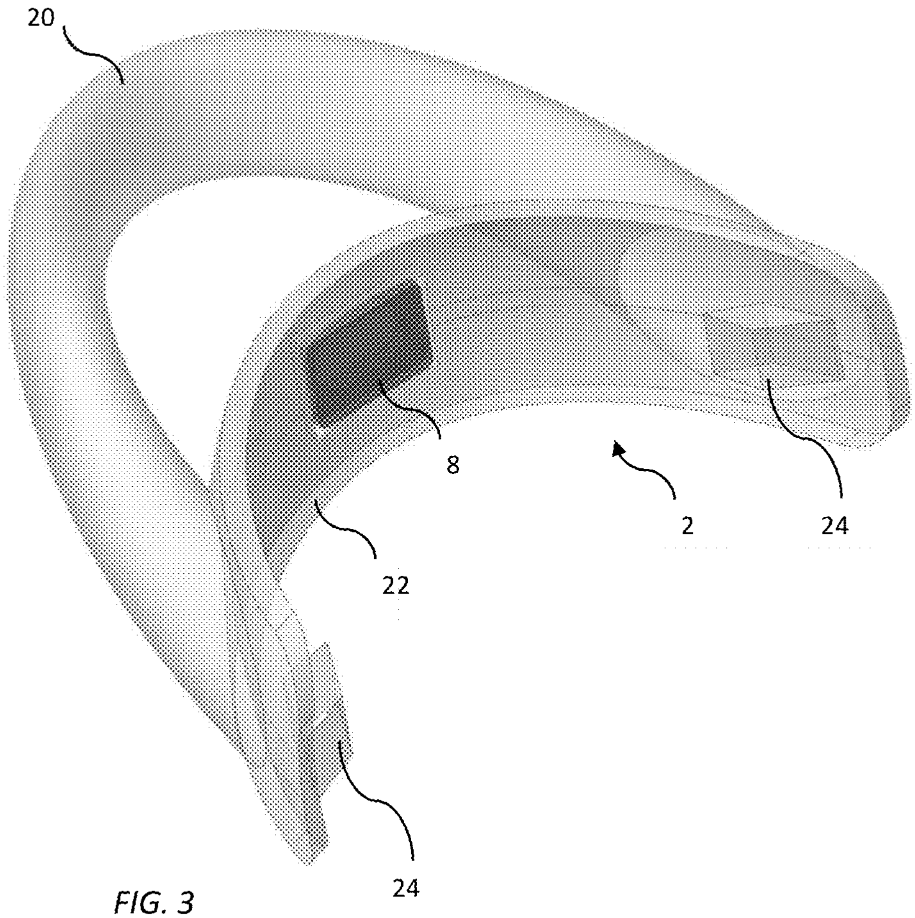
FIG. 3 schematically illustrates an exemplary element 2 comprising a retention member 20.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

FIG. 1*a*) schematically illustrates an exemplary hearing device 6 for a user, where an element 2 is releasably attached to a housing 4 of the hearing device. In the shown example, the hearing device 6 is embodied as an earbud 6, however, one or more features described herein may be equally applicable to other hearing devices, such as a headset, headphone, earphone, earbud, hearing aid, a personal sound amplification product (PSAP), an over-the-counter (OTC) hearing device, a hearing protection device, a one-size-fits-all hearing device, a custom hearing device or another head-wearable hearing device. Hearing devices can include both prescription devices and non-prescription devices. FIG. 1*a*) illustrates an exemplary element 2 configured to be releasably attached to a housing 4 of a hearing device 6 for a user. The element 2 is exchangeable by the user. The element 2 has a dimension which provides that the element 2 is exchangeable by the user's fingers. The element 2 is exchangeable by the user without using a tool. The element 2 comprises a physical filter 8 configured to be arranged in front of an opening (not shown) in the housing 4, when the element 2 is attached to the housing 4.

A dome 26 may be attached to the housing, where the dome is configured to be placed at least partly in the ear canal of the user's ear, when the user is wearing the hearing device in its intended position in the ear.

The element may be attached to the housing of the hearing device by means of a locking mechanism and/or a connection element. The locking mechanism and/or a connection element may be provided on the element and/or on the housing of the hearing device. The locking mechanism and/or connection element may be a belly-band, a snap-fit, a recess, adhesive, adhesive, glue, friction fit, snap/hook, press fit, sticker attachment, protrusion etc.

FIGS. 1*b*)-1*g*) also schematically illustrate exemplary hearing devices for a user, as FIG. 1*a*), where an element is releasably attached to a housing of the hearing device, and where the element comprises a physical filter configured to be attached in front of an opening in the housing. FIG. 1*b*)-1*g*) illustrates different examples of the element.

FIG. 1*b*) schematically illustrates an example where the element is attached to the housing as a belly band, i.e. the element may extend as a loop around the entire perimeter of the housing, e.g. in the center part of the housing, which may be the thickest part of the housing.

FIG. 1*c*) schematically illustrates an example where the element is attached to the housing and extends around the entire perimeter of the housing and covers the housing from about the center part of the housing and down to where the dome is attached the housing.

FIG. 1*d*) schematically illustrates an example where the element is attached to the housing and extends around the entire perimeter of the housing and covers the housing from about the center part of the housing and up to the top of the housing.

FIG. 1*e*) schematically illustrates an example where the element is attached to the housing and extends around the entire perimeter of the housing and covers the housing from about the center part of the housing and down to also cover the dome.

FIG. 1*f*) schematically illustrates an example where the element is attached to the housing and extends around the entire perimeter of the housing and covers the housing from the top part of the housing and down to where the dome is attached the housing.

FIG. 1*g*) schematically illustrates an example corresponding to FIG. 1*a*) where the element is attached to the housing at about or below the center part of the housing, and where the element is a small strip, and where the element does not extend around the entire perimeter of the housing, but only covers a part, such as half, of the perimeter of the housing.

FIG. 2*a*) schematically illustrates an exemplary element 2 configured to be releasably attached to a housing (not shown) of a hearing device (not shown) for a user. The element 2 is exchangeable by the user. The element 2 has a dimension which provides that the element 2 is exchangeable by the user's fingers. The element 2 is exchangeable by the user without using a tool. The element 2 comprises a physical filter 8 configured to be arranged in front of an opening (not shown) in the housing, when the element 2 is attached to the housing.

The element 2 may be attached to the housing of the hearing device by means of a locking mechanism and/or a connection element. The locking mechanism and/or the connection element may be provided on the element 2 and/or on the housing of the hearing device. The locking mechanism and/or connection element may be a belly-band, a snap-fit, a recess, adhesive, friction fit, snap/hook, press fit, sticker attachment, protrusion etc.

FIG. 2*a*) further shows that the element 2 may comprise one or more protrusions 24 for attaching the element 2 to the housing of the hearing device. The protrusions 24 are preferably formed with complementary shapes to one or more recesses formed in the housing of the hearing device, to thereby provide a mechanical connection between the housing and the element 2.

In FIG. 2*a*), the element 2 is shown to be curved to fit the outer curved shape of the housing of the hearing device. The element 2 may be curved in a shape of a half-circle.

In FIG. 2*a*) two protrusions 24 are shown, one in each end of the curved element 24.

FIGS. 2*b*), 2*c*) and 2*d*) schematically illustrate exemplary elements, locking mechanisms and/or connection elements for the housing of the hearing device.

FIG. 2*b*) schematically illustrates an example corresponding to FIG. 2*a*), where the locking mechanisms and/or connection elements are protrusions of the element. The protrusions provide a snap fit or press fit connection to the housing.

FIG. 2*c*) schematically illustrates an example, where the locking mechanisms and/or connection elements is a belly-band or other implementation where the element extends around the entire perimeter of the housing, such as shown in FIGS. 1*a*)-1*f*). This provides an attachment being a compression of the element around the housing.

FIG. 2*d*) schematically illustrates an example, where the locking mechanisms and/or connection elements is an adhesive, glue, sticker etc., whereby the element is attached to the housing by means of adhesive forces.

FIG. 3 schematically illustrates an exemplary element 2 comprising a retention member 20. The retention member is for retention of the hearing device 6 in the user's ear.

The retention member 20 is shaped as a closed-end hoop in FIG. 3. Alternatively, the retention member 20 may be shaped as an open-ended wing, cf. FIG. 4*a*.

FIG. 3 further shows the main body 22 of the element 2, and the physical filter 8 integrated into the main body 22.

Like FIGS. 2*a*) and 2*b*), FIG. 3 further shows that the element 2 may comprise one or more protrusions 24 for attaching the element 2 to the housing of the hearing device.

In FIG. 3, the main body 22 of the element 2 is shown to be curved to fit the outer curved shape of the housing of the hearing device. The element 2 may be curved in a shape of a half-circle.

In FIG. 3 two protrusions 24 are shown, one in each end of the curved main body 22 of the element 24.

FIG. 4*a*) schematically illustrates an exemplary hearing device 6 to be arranged in an ear of a user. The hearing device 6 comprises a housing 4. The housing comprises one or more openings 10.

The one or more openings may be one or more microphone inlets 12 for a microphone 14 in the hearing device 2.

The one or more openings 10 may be one or more vent openings 16 for a vent channel 18 in the hearing device.

An element 2 comprising a physical filter (see FIGS. 4*b*) and 4*c* below) is configured to be arranged in front of the one or more openings 10 in the housing 4, when the element 2 is attached to the housing 4.

FIG. 4*a*) further shows that the element 2 comprises a main body 22 attached to the housing 4 and a retention member 20 extending from the main body 22. The retention member 20 is shaped as an open-ended wing.

FIGS. 4*b*) and 4*c*) schematically illustrate exemplary elements comprising one or more physical filters arranged at one or more different positions corresponding to different positions on the housing where openings are arranged.

For example, as shown in FIG. 4*b*), the element 2 may comprise one physical filter 8 configured to be arranged in front of an opening in the housing (see FIG. 4*a*) above).

For example, as shown in FIG. 4*c*), the element 2 may comprise two physical filters 8 and 8', where a first filter 8 may be arranged in front of an opening being a microphone inlet in the housing (see FIG. 4*a*) above), and a second filter 8' may be arranged in front of an opening being a vent opening in the housing (see FIG. 4*a*) above).

Figure 5:
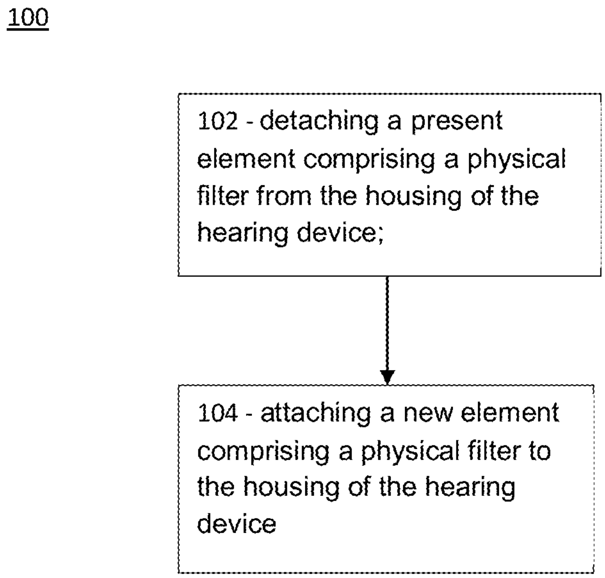
FIG. 5 schematically illustrates an exemplary flow chart for a method 100 for exchanging a physical filter of a hearing device for a user.

FIG. 5 schematically illustrates an exemplary flow chart for a method 100 for exchanging a physical filter of a hearing device for a user. The physical filter is integrated in an element configured to be releasably attached to a housing of the hearing device. The element is exchangeable by the user. The element has a dimension which provides that the element is exchangeable by the user's fingers. The element is exchangeable by the user without using a tool.

The method comprises the step of detaching 102 a present element comprising a physical filter from the housing of the hearing device. The method comprises the step of attaching 104 a new element comprising a physical filter to the housing of the hearing device.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

Items:

1. An element (2) configured to be releasably attached to a housing (4) of a hearing device (6) for a user,
   - wherein the element (2) is exchangeable by the user,
   - wherein the element (2) has a dimension which provides that the element (2) is exchangeable by the user's fingers,
   - wherein the element (2) is exchangeable by the user without using a tool, and
   - wherein the element (2) comprises:
     - a physical filter (8) configured to be arranged in front of an opening (10) in the housing (4), when the element (2) is attached to the housing (4).
2. The element according to any of the preceding items, wherein the opening (10) in the housing is a microphone inlet (12) for a microphone (14) in the hearing device.
3. The element according to any of the preceding items, wherein the opening (10) in the housing is an vent opening (16) for a vent channel (18) in the hearing device.
4. The element according to items 2 or 3, wherein the physical filter provides acoustical tuning for the vent channel and/or the microphone.
5. The element according to any of the preceding items, wherein the physical filter provides protection against ear-wax, water and/or dirt.
6. The element according to any of the preceding items, wherein the element comprises a main body (22) and the physical filter.
7. The element according to the preceding item, wherein the physical filter is integrated in the main body of the element.
8. The element according to items 6 or 7, wherein the physical filter and the main body are made of the same material.
9. The element according to items 6 or 7, wherein the physical filter and the main body are made of different materials.
10. The element according to any of the preceding items, wherein the element is attached to the housing of the hearing device by means of a locking mechanism and/or a connection element.

11. The element according to any of the preceding items, wherein the element comprises a retention member (20) for retention of the hearing device in the user's ear.

12. The element according to the preceding item, wherein the retention member is shaped as an open-ended wing, or as a closed-end hoop.

13. The element according to items 11 or 12, wherein the element is made in a first material and the retention member is made in a second material, and wherein the first material is harder than the second material.

14. A hearing device to be arranged in an ear of a user, the hearing device comprises:

a housing; and an element configured to be releasably attached to the housing, wherein the element is exchangeable by the user, and wherein the element has a dimension which provides that the element is exchangeable by the user's fingers, and wherein the element is exchangeable by the user without using a tool; and wherein the element comprises a physical filter configured to be arranged in front of an opening in the housing, when the element is attached to the housing.

15. A method for exchanging a physical filter of a hearing device, wherein the physical filter is integrated in an element configured to be releasably attached to a housing of the hearing device, wherein the element is exchangeable by the user, and wherein the element has a dimension which provides that the element is exchangeable by the user's fingers, and wherein the element is exchangeable by the user without using a tool, wherein the method comprises:

detaching a present element comprising a physical filter from the housing of the hearing device;

attaching a new element comprising a physical filter to the housing of the hearing device.

LIST OF REFERENCES

2 element
4 housing
6 hearing device
8 physical filter
8' physical filter
10 opening
12 microphone inlet
14 microphone
16 vent opening
18 vent channel
20 retention member
22 main body
24 protrusion
26 dome
100 method
102 method step of detaching a present element comprising a physical filter from the housing of the hearing device
104 method step of attaching a new element comprising a physical filter to the housing of the hearing device

The invention claimed is:

1. An element configured to be releasably attached to a housing of a hearing device for a user, the housing having a proximal end, a distal end, and a longitudinal length between the proximal end and the distal end, the element comprising:

a main body configured to contact an exterior surface of the housing when the element is releasably attached to the housing;

a physical filter configured to be arranged in front of an opening at the housing of the hearing device, when the element is attached to the housing; and a retention member configured for retention of the hearing device with respect to an ear of the user;

wherein the element has a dimension which allows the element to be attached to, and detached from, the housing of the hearing device by fingers of the user without using a tool; and wherein the physical filter is coupled to, or extends from, the main body, and wherein the main body has a length that is shorter than the longitudinal length of the housing of the hearing device when the element is releasably attached to the housing.

2. The element according to claim 1, wherein the physical filter provides protection against earwax, water, dirt, or any combination of the foregoing.

3. The element according to claim 1, wherein the physical filter is integrated in the main body of the element.

4. The element according to claim 1, wherein the physical filter and the main body are made from the same material.

5. The element according to claim 1, wherein the physical filter and the main body are made from different materials.

6. The element according to claim 1, wherein the element is configured to attach to the housing of the hearing device by a locking mechanism and/or a connection element.

7. The element according to claim 1, wherein the retention member is shaped as an open-ended wing, or as a closed-end hoop.

8. The element according to claim 1, wherein the element comprises a main body made from a first material, wherein the retention member is made from a second material, and wherein the first material is harder than the second material.

9. The element according to claim 1, wherein the main body of the element comprises a ring element configured to wrap around the housing and to surround a longitudinal axis of the housing.

10. The element according to claim 1, wherein the main body of the element comprises an arc element configured to wrap partially around the housing.

11. The element according to claim 1, wherein the main body of the element comprises a first protrusion configured to enter into a first opening at an exterior surface of the housing.

12. The element according to claim 11, wherein the main body of the element comprises a second protrusion configured to enter into a second opening at the exterior surface of the housing.

13. The element according to claim 1, wherein the main body has a surface with a curvature when the element is detached from the housing, and wherein the curvature of the surface of the main body corresponds with a curvature of the housing.

14. A hearing device configured to be arranged in an ear of a user, the hearing device comprising:

a housing having a proximal end, a distal end, and a longitudinal length between the proximal end and the distal end; and an element configured to be releasably attached to the housing, wherein the element has a dimension which allows the element to be attached to, and detached from, the housing by fingers of the user without using a tool;

wherein the element comprises a main body and a physical filter configured to be arranged in front of an opening at the housing, when the element is attached to the housing, wherein the main body is configured to contact an exterior surface of the housing when the element is releasably attached to the housing, and wherein the main body has a length that is shorter than the longitudinal length of the housing of the hearing device when the element is releasably attached to the housing; and wherein the element comprises a retention member configured for retention of the hearing device with respect to the ear of the user.

15. The hearing device according to claim 14, wherein the opening at the housing is a microphone inlet for a microphone of the hearing device.

16. The hearing device according to claim 15, wherein the physical filter is configured to provide acoustical tuning for the microphone of the hearing device.

17. The hearing device according to claim 14, wherein the opening at the housing is an vent opening for a vent channel of the hearing device.

18. The hearing device according to claim 17, wherein the physical filter is configured to provide acoustical tuning for the vent channel of the hearing device.

19. A method for exchanging a physical filter of a hearing device, wherein the physical filter is integrated in an element configured to be releasably attached to a housing of the hearing device, the housing having a proximal end, a distal end, and a longitudinal length between the proximal end and the distal end, wherein the element has a dimension which allows the element to be manipulatable by fingers of a user without using a tool, and wherein the element comprises a retention member configured for retention of the hearing device with respect to an ear of the user, wherein the method comprises:

detaching the element comprising the physical filter from the housing of the hearing device using the fingers without using the tool; and attaching a new element comprising a new physical filter to the housing of the hearing device;

wherein the element has a main body configured to contact an exterior surface of the housing, and wherein the main body has a length that is shorter than the longitudinal length of the housing of the hearing device when the element is releasably attached to the housing.

* * * * *